UNITED STATES PATENT OFFICE.

JAMES D. MacDONELL, OF LITTLERIVER, FLORIDA.

COMPOSITION OF MATTER FOR CEMENT.

SPECIFICATION forming part of Letters Patent No. 691,397, dated January 21, 1902.

Application filed October 21, 1901. Serial No. 79,377. (No specimens.)

*To all whom it may concern:*

Be it known that I, JAMES D. MACDONELL, a citizen of the United States, residing at Littleriver, Dade county, State of Florida, have invented a new and useful composition of matter for cement, which is purely hydraulic, to be used for all building purposes, houses, furnaces, bridges, bulkheading, concreting, and paving, of which the following is a specification.

My composition has the following ingredients, combined in the proportions stated, for the manufacture of five barrels of four hundred pounds each of hydraulic cement—viz., three barrels of crushed calcareous rock, one barrel of sulfate of calcium, one barrel of cement, (any manufacture,) four ounces of nitric acid, four ounces of nitro muriatic acid, one quart of crude carbolic acid, and ten gallons of pure water. These ingredients are to be thoroughly mixed by proper methods of machinery used for mixing purposes, then spread on drying-floors and thoroughly dried, and then screened through very fine sieves commonly used in the manufacture of cement. Then it is ready for use and barreling.

With the use of the above composition I have a heavy, smooth, and regular cement, strong and most durable, quick-setting, and purely hydraulic.

What I claim, and desire to secure by Letters Patent of the United States, is—

1. The herein-described composition of matter, consisting of water, carbolic acid, nitro muriatic acid, nitric acid, crushed calcareous rock, sulfate of calcium, and cement of any manufacture, substantially as described, and for the purpose described.

2. The herein-described composition of matter, for the manufacture of cement, consisting of three barrels of crushed calcareous rock, one barrel of sulfate of calcium, one barrel cement, (any manufacture,) four ounces of nitric acid, four ounces of nitro muriatic acid, one quart of crude carbolic acid, and ten gallons of water, substantially as described.

In testimony whereof I have signed my name to this specification in the presence of two subscribing witnesses.

JAMES D. MacDONELL.

Witnesses:
W. I. PETERS,
C. W. BUSH.